United States Patent [19]

MacDonald

[11] 4,057,217
[45] Nov. 8, 1977

[54] VALVE CONSTRUCTION

[75] Inventor: Peter S. MacDonald, Ironia, N.J.

[73] Assignee: Sargent Industries, Inc., Los Angeles, Calif.

[21] Appl. No.: 601,714

[22] Filed: Aug. 4, 1975

Related U.S. Application Data

[63] Continuation of Ser. No. 433,330, Jan. 14, 1974, abandoned.

[51] Int. Cl.² .............................................. F16K 1/22
[52] U.S. Cl. ..................................... 251/308; 251/368
[58] Field of Search ......................... 251/308, 305–307, 251/84, 166, 163, 175, 368; 137/329.1; 126/285

[56] References Cited

U.S. PATENT DOCUMENTS

| 2,308,183 | 1/1943 | Lewis et al. | 251/368 |
| 2,847,181 | 8/1958 | Muller | 251/360 |
| 2,919,885 | 1/1960 | Daigle | 251/308 X |
| 3,312,242 | 4/1967 | Kahn et al. | 251/308 X |
| 3,314,642 | 4/1967 | Kautz et al. | 251/307 |
| 3,384,340 | 5/1968 | Fawkes | 251/307 |
| 3,517,689 | 6/1970 | Roos | 251/306 X |
| 3,591,133 | 7/1971 | Miles | 251/308 X |
| 3,627,259 | 12/1971 | Williams | 251/163 |

FOREIGN PATENT DOCUMENTS

| 233,500 | 10/1959 | Australia | 251/305 |
| 266,092 | 9/1912 | Germany | 251/308 |
| 1,934,203 | 1/1971 | Germany | 251/308 |

*Primary Examiner*—William R. Cline
*Assistant Examiner*—H. Jay Spiegel
*Attorney, Agent, or Firm*—Ellsworth R. Roston

[57] ABSTRACT

A butterfly valve includes a housing, a pivotal stem mounted on housing, and a disk mounted on the stem and tiltable within the housing to control the flow rate of a fluid. Means for attaching the stem to the disk includes a keyway defined by one of the stem and the disk, and an associated pin carried by the other of the stem and the disk. The keyway includes a ramp inclined with respect to the stem at a particular angle, and portions of the pin slide on the ramp in response to temperature change of the fluid to accommodate radial and axial displacement of the disk with respect to the stem. The particular angle of the ramp can be made dependent upon the diameter of the stem and the distance between a fixed point along the stem and the ramp pin. With this particular angle, the pin will slide on the ramp radially and axially of the stem while maintaining a fixed angular relationship between the stem and the disk.

23 Claims, 9 Drawing Figures

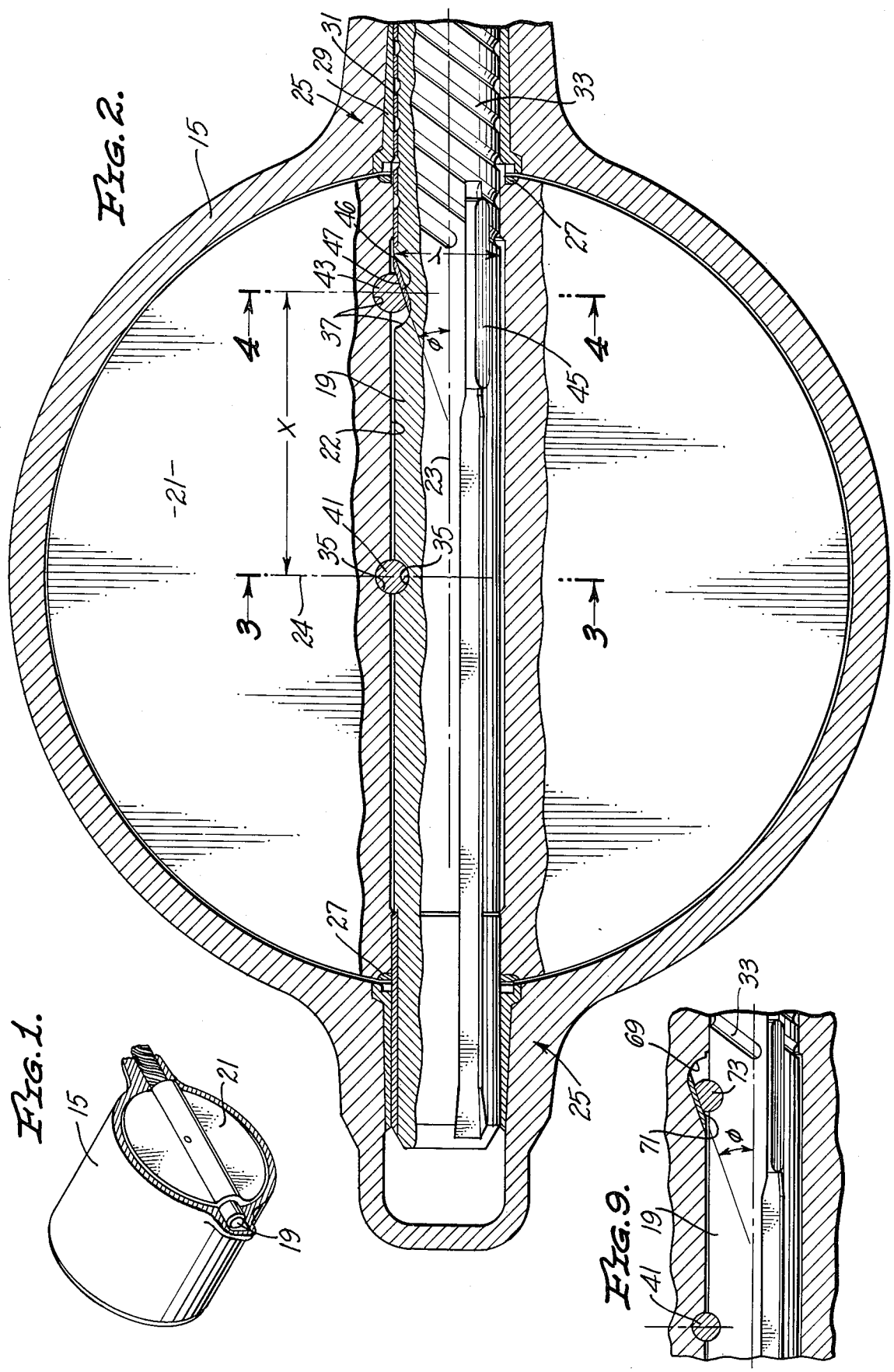

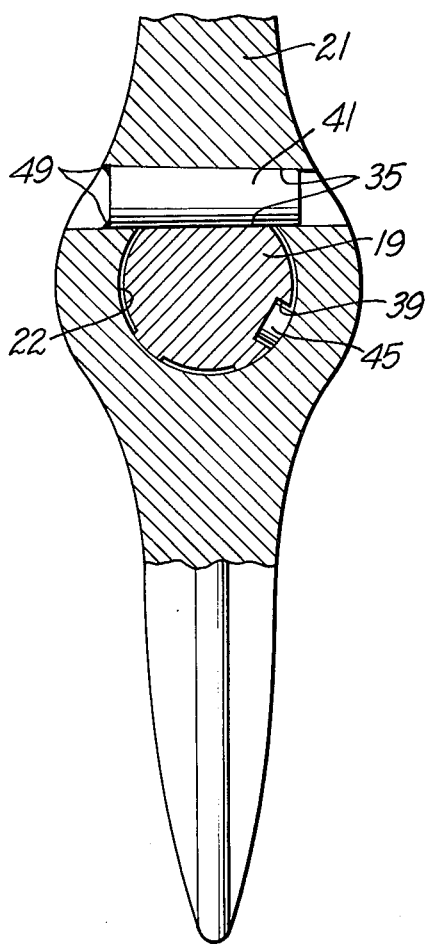
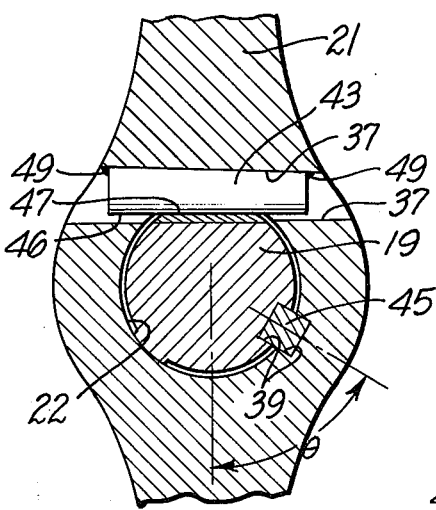
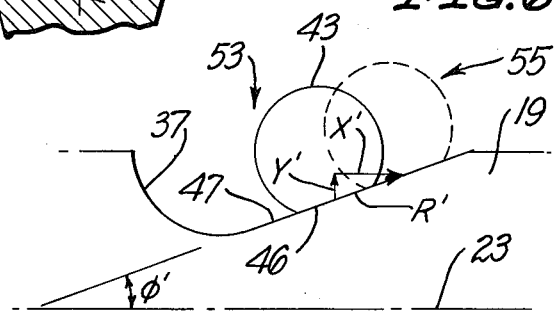
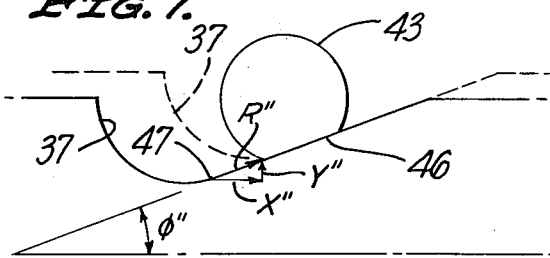
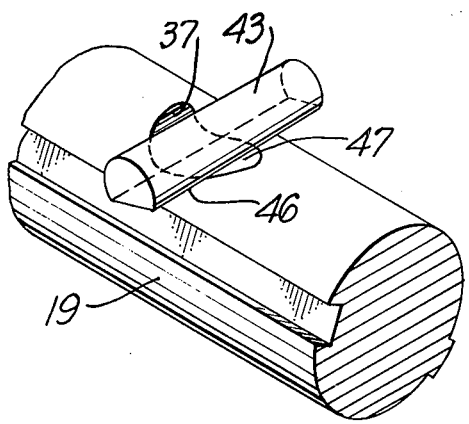
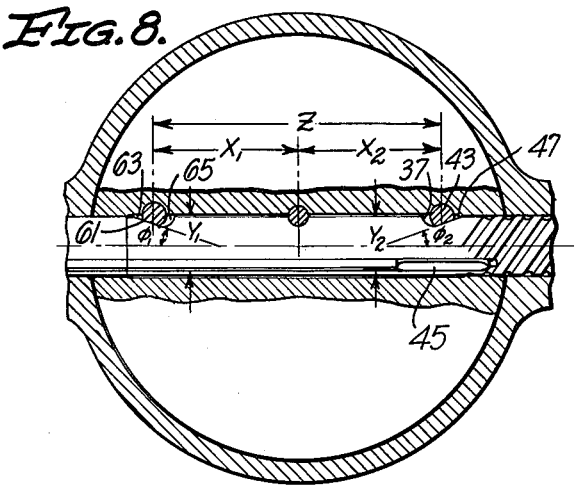

VALVE CONSTRUCTION

This is a continuation, of application Ser. No. 433,330, filed Jan. 14, 1974, now abandoned.

BACKGROUND OF THE INVENTION

1. Field of the Invention

This invention relates generally to valves for controlling the flow rate of a fluid in a conduit and more specifically to butterfly valves for use with fluids which experience significant changes in temperature.

2. Description of the Prior Art

Butterfly valves have been used extensively to control the flow rate of a fluid in a conduit or pipe. Such valves commonly include a housing which defines the flow passageway for the fluid and which has in cross section the configuration of a circle. A stem or shaft has been pivotally mounted on the housing to extend along the diameter of the circle. Damper means such as a circular disk have been disposed interiorly of the housing in a substantially fixed relationship with the stem. The pivoting of this stem has tilted the damper means to open and close the passageway and thereby control the flow rate of the fluid.

The disk has been attached to the stem by configuring the stem and the disk to define at least one keyway. Keys have been disposed in the keyways so that the relative movement between the disk and the stem has been inhibited. The keyways and the keys have typically been provided along lines substantially parallel to the longitudinal dimension of the stem.

This type of valve has had a particularly high failure rate when used for controlling the flow rates of fluids which undergo significant changes in temperature. This failure rate is primarily attributed to the different temperature ranges which are experienced by the stem and the disk. The disk is more directly exposed to the fluid and is exposed to a greater quantity of the fluid than the stem. As a consequence, the temperature of the fluid is substantially that experienced by the disk. The stem, which is exposed to a lesser quantity of fluid and is often isolated from the direct flow of the fluid, undergoes a different temperature change than the disk. As a consequence, even where the disk and the stem have had the same coefficient of thermal expansion, the elongation of the respective elements at their interface has been different.

Since the keys have maintained the respective elements in a substantially fixed relationship, the different elongation characteristics of the disk and the stem have resulted in buckling and warping of the disk with the consequent overstressing of parts. These characteristics have also produced a mechanical looseness which has caused the disk to flutter when the valve has been partially opened. This, of course, has resulted in a significant wear on the elements and an ultimate failure of the valve.

SUMMARY OF THE INVENTION

In accordance with the present invention, a valve is provided with a pivotal stem and a disk supported on the stem. Portions of the stem and the disk define at least one keyway and a pin or key disposed in the keyway maintains the stem and disk in a generally fixed relationship. The keyway and associated key are configured to inhibit angular movement between the disk and the stem. However, in response to a significant change in temperature, the disk and the stem, which will typically expand at different rates, are free to move with respect to each other both axially and radially of the stem. As a result, the overstressing of the parts which typically occurs under these circumstances is not a problem with the present invention. Furthermore, this relative movement occurs with the pin slidingly engaging the keyway so that the preload on the key is maintained and looseness does not develop at the interface between the disk and the stem.

The keyway defined by the disk and the stem is configured to provide a ramp which is inclined radially outwardly of the stem. The pin is provided with a plane which slidingly engages the ramp in the keyway. In a particular embodiment, a reference pin and keyway may also be provided to fix the relationship between the disk and the stem along a vertical center line of the valve. In such an embodiment, the ramp keyway is inclined with respect to the axis of the stem at an angle whose tangent is equal to the diameter of the stem divided by the distance of the ramp pin from the reference pin. The amount of thermal growth of the disk with respect to the stem will depend upon these respective dimensions. By providing the ramp of the keyway with this specific angle, contact between the ramp and the plane of the associated key is maintained even if there are differences between the thermal growth patterns of the disk and the stem. With the maintenance of this contact between the ramp pin and the ramp of the keyway, a slight preload can be maintained to insure that looseness or warping does not result from the differential in thermal growth.

In another embodiment, a pair of ramp pins and associated keyways may be provided on opposite sides of the vertical center line of the disk. In such an embodiment, differential thermal growth can be accommodated by either keyway. Such an embodiment may not include a reference pin.

By accommodating axial and radial movement of the disk with respect to the stem, differential thermal growth does not result in the overstressing of parts. Nonetheless a desirable preload can be maintained to inhibit angular movement between the disk and the stem. As a result, the valve of the present invention is particularly desirable for use with fluids which experience significant temperature changes which produce the differential thermal growth.

These and other features and advantages of the present invention will be more apparent with a description of preferred embodiments of the invention and simultaneous reference to the associated drawings.

DESCRIPTION OF THE DRAWINGS

FIG. 1 is a perspective view of a conduit for fluid and a valve of the present invention for controlling the flow rate of the fluid in the conduit;

FIG. 2 is a front elevational view of the valve and conduit of FIG. 1, illustrating a stem and disk with attachment means including a ramp pin and a ramp keyway;

FIG. 3 is a cross-sectional view of the valve taken on line 3—3 of FIG. 2;

FIG. 4 is a cross-sectional view of the valve taken on line 4—4 of FIG. 2;

FIG. 5 is a perspective view of the ramp pin and associated ramp keyway for attaching the disk to the stem;

FIG. 6 is a front elevational view of a portion of the valve illustrating the movement of the ramp pin with respect to the ramp keyway;

FIG. 7 is a front elevational view of a portion of the valve illustrating movement of the ramp keyway with respect to the ramp key;

FIG. 8 is a front elevational view of an additional embodiment of the valve including a pair of the ramp pins and associated ramp keyways; and FIG. 9 is a front elevational view of still a further embodiment of the valve wherein the ramp keyway is defined by the disk and the ramp pin is carried by the stem.

DESCRIPTION OF PREFERRED EMBODIMENTS

A portion of a conduit or pipe is shown generally in FIG. 1 and designated by the reference numeral 11. The pipe 11 can be used for conducting a fluid, such as liquid sodium, which is commonly used for cooling the reactors in nuclear power plants. To control the flow rate of the fluid, a valve 13 is commonly disposed along the pipe 11. The valve 13 typically includes a housing 15 which defines with the pipe 11 a flow passageway 17, illustrated by the dashed arrow referenced with the same numeral. The flow passageway 17 will typically have in cross section a circular configuration.

The valve 13 can be of the type commonly referred to as a butterfly valve and including a shaft or stem 19 supporting a damper means or disk 21. The disk 21 usually has a substantially planar configuration and a cross section which is similar to that of the flow passageway 17. In the embodiment illustrated, the disk 21 is circular in cross section and symmetrical about a vertical centerline 24.

The stem 19 is pivotally supported by the housing 15, typically in a plane substantially perpendicular to the flow passageway 17. If the pipe 11 has in cross section the configuration of a circle, the stem 19 will usually be supported along the diameter of the circle as illustrated in FIG. 1.

The disk 21 will typically be fixed to the stem 19 so that the pivoting of the stem 19 with respect to the housing 15 tilts the disk 21 within the flow passageway 17. When the stem 19 is pivoted such that the plane of the disk 21 is substantially perpendicular to the flow passageway 17, the disk 21 blocks the flow passageway 17 to inhibit fluid flow. When stem 19 is pivoted such that the disk 21 is tilted to a position substantially parallel to the flow passageway 17, the flow of the fluid is relatively unrestricted. Variations between these two positions, which result from the pivoting of the stem 19, provide the valve 13 with characteristics for controlling the flow rate of the fluid. In the embodiment illustrated, portions of the disk 21 define a cylindrical hole 22 through which the stem 19 extends. The angular relationship between the stem 19 and the disk 21 is substantially fixed by attachment means described in greater detail below.

The stem 19 is longitudinal in configuration and pivots with respect to the housing of 15 about an axis 23. Opposite ends of the stem 19 are supported by stem support means 25 which includes a Stellite washer 27. The stem support means 25 also includes a sleeve 29 which extends along at least a portion of the stem 19.

The sleeve 29 is slightly larger than the stem 19 so that a slight gap 31 exists therebetween. If the valve 13 is used to control the flow rate of a fluid, such as sodium, which has a melting temperature higher than the ambient temperature, a portion of the fluid will pass beyond the washer 27 and into the gap 31. In this region the portion of the fluid will freeze to provide what is commonly referred to as a frozen seal. Frozen sodium shears easily so that it does not significantly interfere with the pivoting of the stem 19 with respect to the housing 15. However, sodium oxides typically form over an extended period of time and these oxides make it more difficult to pivot the stem 19. For this reason, the stem 19 in proximity to the support means 25 is typically provided with at least one channel, such as the spiral channels 33, through which a hot gas can be blown to melt the frozen sodium and clean the stem support means 25.

In a preferred embodiment, the disk 21 is fabricated from a 304 stainless steel forging. The stem 19 is fabricated from wrought A-286 (SA 453 Grade 660) material. These materials are particularly compatible since they have mean coefficients of thermal expansion which are comparable at elevated temperatures. The stem 19 can be provided with a hardface bearing surface 34 of cobalt-chromium (Stellite 6) in the regions of the support means 25. This hardface material providing the surface 34 can be weld deposited and machined to provide the desired orientation after stress relieving.

The present invention is concerned primarily with the means for attaching the disk 21 to the stem 19. This attachment means can be particularly critical if the fluid is of the type which undergoes significant temperature transients. Such a fluid is the liquid sodium which is used for cooling nuclear reactors. In this environment, the liquid sodium can change in temperature from 300° F. to 1200° F. in a time of only one minute. The thermal growth of the valve elements, such as the stem 19 and the disk 21, in response to such a temperature transient can be significant. Of even greater concern is the fact that this growth may take place at different times for the stem 19 and the disk 21.

In accordance with the present invention, the attachment means between the stem 19 and the disk 21 provides for these differences in thermal growth so that these elements of the valve 13 are not significantly stressed. As a result, this disk 21 does not buckle and the disk flutter which usually results from the buckling is less likely to occur.

In the embodiment illustrated in FIG. 2, the attachment means includes a plurality of keyways 35, 37 and 39, each defined by portions of the stem 19 and the disk 21, and a plurality of keys 41, 43 and 45 each associated with one of the keyways 35, 37 and 39, respectively. The keys 41 and 43 can be pins longitudinal in configuration and tapered along their longitudinal dimension. The key 41 snuggly registers with the keyway 35 and provides a reference point for thermal expansion and preloading of other elements of the attachment means. For this reason, this key will be referred to hereinafter as the reference pin 41.

The key 43 is similar to the pin 41 except that it is provided with a flattened surface 46 which is substantially parallel to the axis of the key 43. The portions of the stem 19 which define the keyway 37 are also provided with a flat surface or ramp 47 which slidingly engage the flattened surface 46 of the key 43. In the following discussion of this attachment means, the key 43 and the associated keyway 37 will be referred to as the ramp pin 43 and the ramp keyway 37, respectively.

The taper pins 41 and 43 can be welded to the disk 21 as shown by the weld joints 49 in FIGS. 3 and 4.

The key 45 and the associated keyway 39 can be positioned to extend substantially parallel to the axis 23 of the stem 19. In this position, the key 45 provides means for resisting the torque on the disk 21. Since the torque on the disk 21 of the valve 23 is unidirectional, the key 45 will usually be preloaded in a direction opposite to this torque. The key 45 will typically have a square cross section as shown in FIG. 4 and can be displaced from the plane of the disk 21 by an angle $\theta$ such as 60°.

In the embodiment of FIG. 2, the pin 41 and the ramp pin 43 are separated by a distance X. Also, the stem 19 has a diameter Y which is also approximately the diameter of the cylindrical hole 22.

It is well known that as materials increase in temperature or experience an "up" transient, they expand. In other words, the dimensions of objects, including the dimensions of holes formed by the objects, increase in response to an "up" transient. In like manner, the dimensions of objects decrease in response to a "down" transient. The amount of the dimensional increase is given by the following well known formula:

$$\Delta l = \alpha l \Delta \tau$$

where: $\Delta l$ is the change in length;

$\alpha$ is the coefficient of thermal expansion of the material forming the object;

$l$ is the length of the dimension in question; and $\Delta \tau$ is the change in temperature.

With respect to the present invention, the dimensions of the stem 19 and the disk 21 can be expected to increase when the fluid, such as sodium, increases in temperature, or experiences an "up" transient. For the same reasons, these elements of the valve 13 can be expected to decrease in size when the fluid, such as sodium, decreases in temperature or undergoes a "down" transient. These dimensional changes are of particular importance at the interface between the stem 19 and the disk 21.

Even though the coefficients of thermal expansion of the stem 19 and the disk 21 may be similar, their growth characteristics in response to a change in temperature may still differ if the disk 21 responds to the temperature change more readily than the stem. This can be expected for several reasons. First, the disk 21 has a much greater surface area and therefore, provides a significant exposure to the fluid, such as sodium. Furthermore, in the embodiment illustrated, the portions of the disk 21 which define the hole 22 surround the stem 19 and effectually isolate the stem 19 from the fluid. As a result, the bulk temperature of the disk 21 tends to rise substantially to the new bulk temperature of the fluid before the stem 19 even begins to respond. As a consequence, differential expansion or contraction between the disk 21 and the stem 19 can be expected to occur. In the past, this differential expansion or contraction has resulted in deformation which in turn has produced joint looseness and a fretting action between the stem 19 and the disk 21.

In accordance with the present invention, the differential expansion or contraction at the interface between the stem 19 and the disk 21 is accommodated by providing the ramp keyway 37 and the ramp pin 43 with a capability for relative movement both axially and radially of the stem 19. For example, the ramp 47 can be defined to extend radially outwardly with progressive positions from the reference pin 41. With this orientation, the ramp 47 faces the reference pin 41 so that an extension of the ramp 47 at the interface between the disk 21 and the stem 19 does not intersect the center line 24. With respect to the axis 23 of the stem 19, the ramp is inclined at the angle $\phi$. The surface 46 of the ramp pin 43 is in substantial contact with the ramp 47 and is therefore disposed at the same angle $\phi$ with respect to the axis 23.

The sliding relationship between the pin 43 and the keyway 37 can be better understood with reference to FIGS. 6 and 7 wherein the keyway 37 is shown substantially enlarged to facilitate the explanation. In FIG. 6, the keyway 37 is assumed to be stationary while the pin 43 moves relative to the keyway 37. In FIG. 7, the pin 43 is assumed to be stationary while the keyway 37 moves relative to the pin 43. Although these relative movements may occur simultaneously, they proceed in the same direction, in the manner to be discussed, the therefore can be considered separately to facilitate the explanation.

In response to an "up" transient in the fluid, such as sodium, the disk 21 will tend to expand radially and axially of the stem 19 from any point or points at which the stem 19 and the disk 21 have a substantially fixed relationship. For example, in the embodiment illustrated in FIG. 2, the stem 19 and the disk 21 have an axially fixed relationship in proximity to the reference pin 41. Thus, in FIG. 6, the ramp pin 43 will move axially of the ramp keyway 37 a distance X' dependent upon the distance X separating the ramp pin 43 and the reference pin 41, the coefficience of thermal expansion of the disk 21, and the change of the temperature of the disk 21 in response to the temperature change of the fluid. In FIG. 6, the distance X' is illustrated by the horizontal arrow X'.

In response to an "up" transient or an increase in temperature, the cylindrical hole 22 of the disk 21 will tend to expand. With respect to the axis 23 of the stem 19, this expansion will cause the pin 43 in FIG. 6 to move radially a distance Y' dependent upon the diameter of the hole 22 (which is substantially the diameter Y of the stem 19), the coefficient of thermal expansion of the disk 21, and the change of the temperature of the disk 21 in response to the temperature change of the fluid. The distance Y' is shown by the vertical arrow in FIG. 5.

The pin 43 will move the horizontal distance X' and the vertical distance Y' simultaneously, so that relative movement will actually take place along a vector R' from a position shown by the solid outline 53 to a position shown by the dotted outline 55. The angle of the vector R' with respect to the axis 23 is the angle $\phi'$ whose tangent is equal to the quotient of the distance Y' and the distance X'. Since the coefficient of thermal expansion and the temperature change of the fluid affect both the distances X' and Y' to the same extent, the distances X' and Y' have the same ratio as the distances X and Y, respectively. Thus, it is apparent that the angle $\phi'$ is also the angle whose tangent is the quotient of the distance Y and the distance X. In other words, the angle $\phi'$ is the angle whose tangent is equal to substantially the diameter of the stem 19, divided by the axial separation of the ramp pin 43 and the reference pin 41.

Referring now to FIG. 7 it will be assumed that the thermal expansion of the disk 21 has occurred so that the pin 43 is substantially stationary and that the growth of the stem 19 is taking place in response to increase in temperature of the fluid. In response to this "up" transient, the stem 19 in FIG. 7 will expand axially from the reference pin 41 a distance X' which is dependent upon the distance X, the coefficient of thermal expansion of the stem 19, and the change in the temperature of the stem 19 in response to the temperature change of the fluid. The keyway 37 defined by the stem 19 will also move radially of the axis 23 a distance Y" which is dependent upon the diameter Y of the stem 19, the coefficient of thermal expansion of the stem 19, and the change in the temperature of the stem 19 in response to the temperature change of the fluid.

Movement of the keyway 37 the distance X" and the distance Y" will occur simultaneously. Thus with respect to the key 43, the keyway 37 will move along a vector R" from a position shown by a solid outline 57 to a position shown by a dotted outline 59. The vector R" is disposed with respect to the axis 23 at an angle $\phi''$ whose tangent is equal to the quotient of the distance Y" and the distance X". Since the coefficient of thermal expansion of the stem 19 and the change in the temperature of the fluid affect the distance X' and Y" to the same extent, it is apparent that the angle $\phi''$ is the angle whose tangent is equal to the distance Y divided by the distance X. It has already been shown that the angle $\phi'$ has this same relationship to the distances X and Y. Thus, the movement of the pin 43 with respect to the keyway 37, as shown in FIG. 6, and the movement of the keyway 37 with respect to the pin 43, as shown in FIG. 7, occur at the same angle with respect to the axis 23. Effectually, this means that whether these relative movements occur separately or simultaneously, the surface 46 of the pin 43 will slide along the ramp 47 of the keyway 37.

It will be apparent to those skilled in the art that a similar analysis can be made to show that the pin 43 will slide in the opposite direction with respect to the ramp 47 in response to a "down" transient of the fluid.

In a further embodiment of the invention the ramp pin 43, keyway 37, and key 45 are provided substantially as illustrated in and described with reference to FIG. 2. In this particular embodiment, however, there is no reference pin, such as the pin 41 illustrated in FIG. 2. Rather, a second ramp pin 61 is provided which slidingly engages a ramp 63 in a keyway 65. The keyway 65 may be positioned radially on the same side of the stem 19 as the keyway 37 but the ramp 63 is defined to face the ramp 47.

In the absence of a reference pin, there is no fixed point of reference for axial expansion. As a result, the axial growth of the disk 21 with respect to the stem 19 will be divided between the ramp pins 43 and 61 depending upon the particular pin and ramp combination which offers the least resistance to sliding. In greater detail, the ramp 63 can be inclined relative to the axis 23 at an angle $\phi_1$ which is equal to the arc tangent of $Y_1$ divided by $X_1$. Similarly, the ramp 47 can be inclined with respect to the axis 23 at an angle $\phi_2$ which is equal to the arc tangent of the dimensions $Y_2$ divided by $X_2$. Without a reference pin, the dimensions $X_1$ and $X_2$ cannot be defined but in general it is apparent that their sum must be equal to a separation distance Z between the ramp pins 43 and 61. In such an embodiment, the angle $\phi_1$ and $\phi_2$ have the following relationship when $Z = X_1 + X_2$:

$$\phi_1 = \arctan Y_1/X_1 = \arctan (Y_1/Z - X_2)$$

$$\phi_2 = \arctan Y_2/X_2 = \arctan (Y_2/Z - X_1)$$

In the embodiment illustrated, these pins 43 and 61 are disposed equidistant from the vertical center line 24 so that $X_1 = X_2$. Since $Y_1 = Y_2$ in this embodiment, it follows that the angle $\phi_1$ is equal to the angle $\phi_2$.

Referring now to FIG. 9, a further embodiment of the invention illustrates that a ramp keyway can be defined by the disk 21 and the associated ramp pin can be carried by the stem 19. In this embodiment, the reference pin 41 and key 45 perform the functions discussed with reference to previous embodiments. However, portions of the disk 21, rather than the stem 19, define a ramp keyway 69 including a ramp 71. A ramp pin 73 is provided with a substantially fixed relationship with the stem 19 rather than the disk 21. The ramp 71 is inclined with respect to the axis 23 of the stem 19 at an angle $\phi$ which can be determined in the manner previously discussed to provide the desired sliding relationship between the ramp 71 and the pin 73.

As was the case with the ramp 47, the ramp 71 extends radially outwardly of the axis 23 with progressive positions from the reference pin 41. However, with this orientation, the ramp 71 faces away from the reference pin 41 so that an extension of the ramp 71 at the interface between the stem 19 and the disk 21 intersects the center line 24. In the manner previously discussed, the ramp pin 73 of this embodiment will slide on the ramp 71 to accommodate radial and axial expansion between the stem 19 and the disk 21 while maintaining the desired preload on the key 45.

In all of these embodiments, the sliding relationship of the ramp key 43 and the associated ramp 47 is of particular advantage to the present invention since it accommodates relative movement between the stem 19 and the disk 21 in response to thermal expansion and contraction of these elements with respect to each other. Nonetheless, contact is maintained between the disk 21 and the pin 43, and the pin 43 and the stem 19, so that the preload on the pin 43 is maintained in spite of the differential expansion and contraction. Furthermore, there are no shearing forces on either the reference pin 41 or the ramp pins 43 and 61. These pins can therefor function primarily to maintain a preload on the key 45 which is positioned to more effectively resist the torque on the disk 21. The result is a valve which is capable of accommodating differences in thermal expansion while maintaining a substantially constant preload on the attachment means between the step 19 and the disk 21. As a result, there is no deformation of the disk 21 which heretofore has resulted in joint looseness and ultimate failure of the valve. These advantages can be particularly appreciated when the valve 13 is used to control the flow rate of fluids which undergo significant temperature changes.

Although the invention has been described with reference to specific embodiments and additional means including one or more ramp keyways, it will be apparent that the valve can be otherwise embodied so that the scope of the invention should be ascertained only with reference to the following claims:

I claim:

1. A valve providing an efficient and predetermined operation even with temperature change, including:
   a housing;
   a stem having an axis and being pivotal relative to the housing on the axis of the stem as a fulcrum and having a first rate of expansion or contraction to changes in temperature;

a disc mounted on the stem interiorly of the housing, the disc having characteristics for being tilted to open and close the valve and having a second rate of expansion or contraction to changes in temperature where the second rate of expansion or contraction is different from the first rate of expansion or contraction;

means attaching the stem and the disc at a first position for rotation of the disc with the stem and providing a reference point for differences in the first rate of expansion or contraction of the stem to the changes in temperature and the second rate of expansion or contraction of the disc to the changes in temperature; and means providing a coupling between the disc and the stem at a position displaced along the stem from the attaching means and responsive to differences in the rate of expansion or contraction of the stem and the disc to the temperature changes for providing the displacement of the disc radially and axially relative to the stem as a result of such differences in the rate of expansion or contraction of the stem and the disc to such temperature changes.

2. The valve recited in claim 1 wherein the coupling means includes:

at least one of the stem and the disc defining at least one ramp; and at least one ramp pin carried by the other of the stem and the disc and having portions slidingly engaging the ramp; and the ramp being inclined with respect to the axis of the stem to facilitate radial and axial displacement of the disc with respect to the stem as a result of the differences in the rate of expansion or contraction of the stem and the disc to such temperature changes.

3. The valve recited in claim 2 wherein the coupling means includes:

first portions of one of the stem and the disc defining a first ramp inclined in a first direction at a first angle with respect to the axis of the stem and displaced from the attaching means by a particular distance in a first direction along the stem;

second portions of one of the stem and the disc defining a second ramp inclined in an opposite direction at the first angle with respect to the axis of the stem and displaced from the attaching means by the particular distance in a second direction along the stem opposite to the first direction; and the first angle having a magnitude dependent upon the axial distance between the first ramp and the second ramp relative to the thickness of the stem.

4. The valve recited in claim 2 wherein the attaching means comprises a reference pin having a fixed relationship with the disc and the stem, and the angle of the ramp with respect to the axis of the stem is dependent upon the axial distance between the reference pin and the ramp pin relative to the thickness of the stem.

5. A valve for controlling the flow rate of a fluid in an efficient and predetermined manner even with temperature variations comprising:

fluid conductor means for defining a flow passageway for the fluid;

a stem supported by the fluid conductor means and pivotal relative to the fluid conductor means on an axis having a transverse relationship with respect to the flow passageway and having a first rate of contraction and expansion in response to the temperature variations;

a disc supported by the stem for pivotal movement with the stem, relative to the fluid conductor means, between a first position wherein the flow passageway is substantially closed and a second position wherein the flow passageway is substantially open, the disc having a second rate of contraction and expansion in response to the temperature variations where the second rate of expansion or contraction is different from the first rate of contraction and expansion;

a first pin disposed in coupled relationship to the stem and the disc at a first position along the stem and providing a reference point for differences in the first rate of contraction and expansion of the stem to the changes in temperature and the second rate of contraction and expansion of the disc to the changes in temperature;

portions of a particular one of the stem and disc defining a ramp having an angular relationship with the axis of the stem and having a displaced relationship along the stem from the first pin; and a second pin carried by the other of the stem and the disc in sliding engagement with the ramp and slidable along the ramp as a result of the differences between the first and second rates of contraction and expansion to compensate for such differences.

6. The valve recited in claim 5 wherein the disc is generally symmetrical about a centerline extending substantially perpendicular to the axis of the stem at an intermediate position between opposite ends of the fluid conductor means and the portion of the particular one of the stem and the disc defining the ramp extends radially outwardly of the axis of the stem with progressive positions from the centerline of the disc.

7. The valve recited in claim 6 wherein:

the stem defines the ramp;

the disc carries the second pin; and the ramp is included such that the position defining the intersection of the disc and the ramp is displaced from the centerline of the disc.

8. The valve recited in claim 6 wherein:

the disc defines the ramp;

the stem carries the second pin; and the ramp is inclined such that the position defining the intersection of the stem and the ramp intersects the centerline of the disc.

9. The valve recited in claim 5 wherein the first pin is disposed between the disc and the stem at the center of the disc in the direction of the axis of the stem and wherein the stem has a generally longitudinal configuration with an annular cross section and the ramp is inclined, with respect to the axis of the stem, at a particular angle which is dependent upon the ratio between the distance between the centers of the first and second pins and the diameter of the stem.

10. The valve set forth in claim 5 wherein:

the particular angle of the ramp with respect to the axis of the stem has a logarithmic relationship to the distance between the centers of the first pin and the second pin.

11. A valve providing an efficient and predetermined operation even with temperature variations, including:

a housing defining a flow passageway and having an annular configuration in cross section;

a shaft having an axis corresponding to the diameter of the annular configuration of the housing and pivotably mounted on the housing with the axis of the shaft defining a fulcrum for pivotable movement of the shaft;

a disc pivotable with the shaft and forming with the shaft a pivotable valve element for controlling the flow of the fluid through the flow passageway defined by the housing;

a pin coupling the shaft and the disc at the center of the disc in the axial direction of the stem to provide for pivotable movement of the disc with the shaft;

a first portion of a particular one of the shaft and the disc defining a keyway with the other one of the ramp and the disc, the first portion having an inclined relationship with respect to the axis of the shaft and being displaced from the center of the housing in the direction of the axis of the shaft;

the disc having a first rate of expansion or contraction with variations in temperature and the shaft having a second rate of expansion or contraction with variations of temperature and the first and second rates being different; and a key registered with the keyway and carried by the other one of the shaft and the disc and slidingly engaging the keyway to provide for an expansion or contraction of the shaft relative to the disc with such temperature variations, thereby to maintain the shaft and the disc in a substantially fixed angular relationship with such temperature variations so that the disc is substantially non-rotatable with respect to the shaft even with such temperature variations.

12. The valve recited in claim 11 wherein:
the shaft has an annular configuration in cross section and wherein the keyway and the key are displaced from the center of the annular configuration of the housing in the axial direction of the shaft and the inclination of the keyway is dependent upon the displacement of the keyway from the center of the annular configuration of the housing in the axial direction of the shaft relative to the diameter of the annular configuration of the shaft.

13. The valve recited in claim 11 wherein the valve further comprises:
a second portion of the particular one of the disc and the shaft defining a second keyway displaced from the center of the pin an axial distance at least equal to the axial distance separating the first keyway and the center of the pin and displaced from the pin in an opposite direction to the displacement of the first keyway from the pin and having an inclined relationship with the shaft; and
a second key registered with the second keyway and carried by the other one of the shaft and the disc and slidingly engaging the second keyway to provide for an expansion or contraction of the shaft relative to the disc with such temperature variations thereby to maintain the shaft and the disc in the substantially fixed angular relationship with such temperature variations so that the disc is substantially nonrotatable with respect to the shaft even with such temperature variations.

14. The valve recited in claim 13 wherein the inclined surfaces of the first and second keyways are flat and the first key has a flat surface slidingly engaging the first keyway and the second key has a flat surface slidingly engaging the second keyway.

15. The valve set forth in claim 14 wherein:
the shaft is cylindrical in configuration;
the first keyway is inclined in a first direction with respect to the axis of the cylindrical shaft at an angle dependent upon the diameter of the shaft and the axial distance along the shaft between the first keyway and the center of the pin; and
the second keyway is inclined in a second direction with respect to the axis of the cylindrical shaft at an angle dependent upon the diameter of the shaft and the axial distance along the shaft between the second keyway and the center of the pin and the second direction is opposite to the first direction.

16. A valve for controlling the flow rate of a fluid even with temperature changes including:
a housing;
a stem having an axis and pivotal relative to the housing on the axis of the stem as a fulcrum and having a first rate of expansion or contraction in response to such temperature changes;
a disc mounted on the stem interiorly of the housing, the disc being pivotable with the stem to open and close the valve and having a second rate of expansion or contraction in response to such temperature changes where the second rate is different from the first rate;
first means interconnecting the stem and the disc at an intermediate position along the axial length of the stem in the housing and providing a reference for any difference between the first rate of expansion or contraction of the stem in response to the temperature changes and the second rate of expansion or contraction of the disc in response to the temperature changes; and
second means interconnecting the disc and the stem at a position displaced from the first means and in a slidable relationship with the disc and the stem for facilitating radial and axial displacement of the disc with respect to the stem as a result of the differences between the first and second rates of expansion or contraction to inhibit angular displacement of the disc relative to the stem.

17. In a valve as set forth in claim 16, the second interconnecting means including:
at least one of the stem and the disc defining at least one ramp;
at least one ramp pin carried by the other of the stem and the disc, the ramp pin having portions slidingly engaging the ramp;
the first interconnecting means including:
a reference pin having a fixed relationship with the disc and the stem; and
the ramp being inclined with respect to the axis of the stem at an angle dependent upon the distance between the reference pin and the ramp pin and the thickness of the stem to facilitate the axial and radial displacement of the disc with respect to the stem.

18. The valve recited in claim 17 wherein the interconnecting means further comprises:
first portions of the disc and first portions of the stem defining a first keyway; and
the reference pin being disposed in the first keyway and inhibiting relative movement between the first portions of the disc and the first portions of the shaft.

19. A valve for controlling the rate of flow of fluid even with temperature changes in the fluid to maintain such rate of flow independent of the temperature changes including:
a hollow housing;
a shaft disposed in the housing on a particular axis in a pivotal relationship with respect to the housing and having a first rate of expansion or contraction in response to such temperature changes;
a disc mounted on the shaft interiorly of the housing, the disc being pivotable with the shaft to open and close the valve and having a second rate of expansion or contraction in response to such temperature changes where such second rate is different from the first rate;
first means disposed in interconnecting relationship with the shaft and the disc at an intermediate position along the axial length of the shaft in the housing for pre-loading the disc and the shaft and for providing a pivotal movement of the disc with the shaft; and
second means disposed in transverse relationship to the particular axis and in interconnecting relationship with the shaft and the disc at a position displaced from the first means along the axial length of the shaft in the housing for providing radial and axial placements between the disc and the shaft as a result of the differences between the first and second rates of expansion or contraction to maintain a particular pivotal relationship of the disc and the shaft relative to the housing even with such temperature changes.

20. The valve recited in claim 19 wherein the second means includes:
portions of the shaft and portions of the disc defining an inclined keyway; and
a first key disposed in the keyway for slidable movement along the keyway as a result of the differences in the first and second rates of expansion or contraction to inhibit rotational movement of the disc relative to the shaft even with the temperature changes.

21. The valve recited in claim 20 wherein the housing defines a center in cross section and the first means includes a reference key at the center of the housing in coupled relationship to the disc and the shaft in the axial direction of the shaft and wherein the keyway is ramped at an angle dependent upon the distance between the center of the reference key and the center of the first key relative to the diameter of the shaft and the first key has a surface inclined at the ramp angle for disposition on the keyway and slidable movement along the keyway as a result of the difference in the first and second rates of expansion or contraction.

22. A butterfly valve for controlling the rate of flow of a fluid having significant temperature transients to maintain the rate of flow independent of the temperature transients, the valve comprising:
hollow housing through which the fluid is conducted;
fulcrum means substantially longitudinal in configuration and disposed in the housing and supported by the housing pivotally with respect to the housing on a fulcrum extending along the length of the fulcrum means and having a first rate of expansion or contraction in response to such temperature transients;
damper means disposed interiorly of the housing and adjacent the fulcrum means in a substantially fixed angular relationship with respect to the fulcrum means and having a second rate of expansion or contraction in response to such temperature transients where the second rate is different from the first rate, the damper means being pivotable with the fulcrum means to control the flow of the fluid through the housing;
means attaching the fulcrum means and the damper means at a position intermediate the length of the fulcrum means in the housing and providing a reference for differences in the first rate of expansion or contraction of the fulcrum means in response to the temperature transients and the second rate of expansion or contraction of the damper means in response to the temperature transients;
coupling means having a contiguous relationship with the fulcrum means and the damper means at a position displaced from the attaching means along the length of the fulcrum means and coupling the fulcrum means and the damper means to provide for displacements of the damper means with respect to the fulcrum means as a result of the differences between the first and second rates of expansion or contraction to maintain the adjacent and fixed angular relationship between the fulcrum means and the damper means,
the fulcrum means including a shaft cylindrical in configuration and pivotal on the housing on the axis of the shaft as a fulcrum;
the damper means including a disc mounted on the shaft;
the attaching means including a first pin having a contiguous relationship with the disc and the shaft and extending at least partially through the disc in a direction transverse to the axis of the shaft;
the coupling means including at least a second pin having a contiguous relationship with the disc and the shaft and extending at least partially through the disc in a direction transverse to the axis of the shaft to inhibit angular displacements between the disc and the shaft,
a particular portion of the second pin defining a first inclined plane;
a particular portion of the shaft defining a second plane having the same inclination as the first inclined plane; and
the particular portion of the second pin being disposed on the particular portion of the shaft in slidable relationship with the shaft for sliding movement along the shaft in accordance with the temperature transients to provide for movement of the disc both radially and axially relative to the shaft in accordance with the temperature transients to inhibit angular motion between the disc and the shaft during such temperature transients.

23. A butterfly valve for controlling the rate of flow of a fluid having temperature changes to maintain the rate of flow independent of the temperature changes, the valve comprising:
a housing through which the fluid is conducted;
fulcrum means substantially longitudinal in configuration and having a longitudinal axis and disposed in the housing and supported by the housing and pivotal with respect to the housing about a fulcrum extending along the longitudinal axis of the fulcrum means and having a first rate of expansion or contraction in response to the temperature changes;
damper means disposed interiorly of the housing in a substantially fixed angular relationship with the fulcrum means and having a second rate of expansion or contraction in response to the temperature changes where the second rate is different from the first rate, the damper means being pivotable with the fulcrum means to control the flow of fluid through the housing;

means operatively coupled to the fulcrum means and the damper means at an intermediate position along the length of the longitudinal axis of the fulcrum means in the housing for providing a particular pre-loading of the fulcrum means and the damper means with respect to the pivotal disposition of the damper means and for providing a pivotal movement of the damper means with the fulcrum means;

control means operatively coupled to the damper means and the fulcrum means at a position displaced from the pre-loading means along the length of the longitudinal axis of the fulcrum means in the housing for providing for changes in the relative dimensions of the fulcrum means and the damper means as a result of the differences in the first and second rates of expansion or contraction to maintain the particular pre-loading of the fulcrum means and the damper without deforming the fulcrum means and the damper means, the control means having properties for providing for a movement between the damper means and the fulcrum means in the axial and radial directions as a result of the differences in the first and second rates of expansion or contraction to maintain the particular pre-loading between the damper means and the fulcrum means, and the control means including a ramp on a particular one of the fulcrum means and the damper means and further including means retained by the other one of the fulcrum means and the damper means and slidable along the ramp in accordance with the relative movements between the damper means and the fulcrum means for maintaining the particular pre-loading between the damper means and the fulcrum means even with the temperature changes.

* * * * *